United States Patent [19]

Oppenlaender et al.

[11] 4,405,494

[45] Sep. 20, 1983

[54] POLYHYDROXY-POLYALKYLENE-POLYA-MINE SALTS OF MALEIC AMIDE ACIDS AS CORROSION INHIBITORS IN WATER-IN-OIL EMULSIONS

[75] Inventors: Knut Oppenlaender; Erich Schwartz, both of Ludwigshafen; Klaus Barthold, Mannheim; Wilhelmus Slotman, Ludwigshafen, all of Fed. Rep. of Germany

[73] Assignee: BASF Aktiengesellschaft, Ludwigshafen, Fed. Rep. of Germany

[21] Appl. No.: 329,381

[22] Filed: Dec. 10, 1981

[30] Foreign Application Priority Data

Dec. 16, 1980 [DE] Fed. Rep. of Germany ....... 3047304

[51] Int. Cl.$^3$ .................. C23F 11/14; C23F 11/12
[52] U.S. Cl. .................. 252/392; 106/11.15; 106/14.31; 208/47; 252/8.55 E; 252/357; 422/12; 422/16; 260/501.11

[58] Field of Search .................. 252/392, 8.55 F, 357; 106/14.15, 14.31; 208/47; 422/12, 16; 260/501.11, 50.12

[56] References Cited

U.S. PATENT DOCUMENTS 3,985,504 10/1976 Kindscher et al. .................. 252/392
4,207,285 6/1980 Oppenlaender et al. ............ 252/392
4,216,238 8/1980 Baker et al. ...................... 260/501.11
4,238,349 12/1980 Larsen et al. ....................... 252/392

FOREIGN PATENT DOCUMENTS 689340 5/1967 Belgium .
2427400 12/1979 France .

Primary Examiner—Irwin Gluck
Attorney, Agent, or Firm—Andrew E. Pierce

[57] ABSTRACT

Polyhydroxy-polyalkylene-polyamine salts of maleic amide acids are useful metal corrosion inhibitors for use in water-in-oil emulsions.

20 Claims, No Drawings

POLYHYDROXY-POLYALKYLENE-POLYAMINE SALTS OF MALEIC AMIDE ACIDS AS CORROSION INHIBITORS IN WATER-IN-OIL EMULSIONS

BACKGROUND OF THE INVENTION

1. Field of the Invention

This invention relates to the corrosion inhibition of iron or metal containing iron in contact with water-in-oil emulsions.

2. Description of the Prior Art

In technical processes where iron or metals containing iron come in contact with aqueous systems, the problem of corrosion is encountered. These problems are particularly serious when the aqueous system is based on salt water as is normally the case in numerous natural oil recovery and treatment processes.

From German published application No. 24 37 920 adducts of maleic anhydride to longer chained unsaturated fatty acids are known which are used as corrosion inhibitors for salt water-in-oil emulsions. In some cases, however, these substances are not sufficiently effective.

From German Application No. 11 49 843 amine salts of amide acids are known which are obtained by reaction of, for instance, maleic anhydride with alkyl amines containing 4 to 30 carbon atoms per alkyl group and subsequent neutralization with such amines and which act among other things as rust preventives even in the presence of sea water.

However, these substances are either not water soluble or if they are in the form of lower amine salts are very difficult to dissolve in water, which prevents their use in water-in-oil emulsions which are to be separated later since the substances will then be present only in the oil phase thus allowing the salt water to freely corrode the iron which is present in the lines and in the vessels used.

The purpose of this invention was to determine substances which are effective as corrosion inhibitors in those petroleum-containing liquids which come in contact with iron or metals containing iron in the recovery, processing, transport, and storage of petroleum. That is, they must be soluble and/or dispersible in the water as well as in the oil phase of said liquids in order to uniformly protect the corrosion prone metals. Another goal of this invention consisted of finding such corrosion inhibitors which can be uniformly distributed at least in a colloidially dispersed form even in concentrated salt solutions.

SUMMARY OF THE INVENTION

Salts of maleic amide acids are effective corrosion inhibitors for iron and iron-containing metals in the presence of water-in-petroleum oil emulsions. The salts of the invention have the formulas:

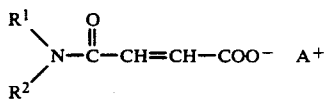

in which $R^1$ represents $C_7$ to $C_{20}$ alkyl radical, $R^2$ stands for hydrogen or $R^1$ and $A^+$ represents the protonized radical of an amine of formula II

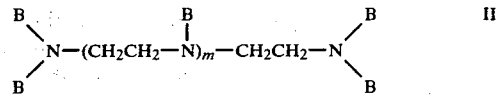

in which B stands for hydrogen or the radical $(C_2H_4O)_x$, wherein x is an integer of 1-3 provided that the total number of the $C_2H_4O$ radicals in the molecule is 3-18 and m stands for 1 or 2.

DETAILED DESCRIPTION OF THE INVENTION

Salts with similar structures, namely, alkanolamine salts of specially defined maleic amide acids, that is, substances which are based on ammonia, which was ethoxylated once or several times are known from German published Application No. 27 58 123. They are used as corrosion inhibitors in technical cleaning and cooling processes where emphasis is placed on pronounced low foaming properties in addition to the corrosion protection effect. They are less suited for oil processes since these materials are not very soluble in the oil phase.

The maleic amide acids upon which the salts are based have the formula:

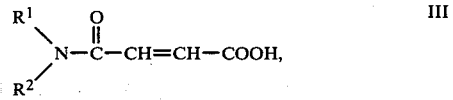

wherein $R^1$ represents an alkyl radical having 7 to 20 carbon atoms and $R^2$ represents hydrogen or $R^1$.

Preferred representatives are compounds having the formula III, in which $R^2$ represents hydrogen. Among these formulas, in turn, those are preferred where the amide acid is derived, for instance from $C_{10}$ to $C_{18}$ primary alkyl amines. Of particular technical interest are maleic amide acids such as maleicoctyl-, -decyl, -dodecyl-, -tridecyl-and/or -octadecylamide acid, containing straight chained or branched alkyl groups. These maleic amide acids can also be used as mixtures. The amines upon which the amide components are based can be derived, for instance, also from $C_9$ to $C_{11}$, also from $C_{13}$ to $C_{15}$, or $C_{17}$ to $C_{19}$ oxoalcohol mixtures.

The salt components of the maleic amide acids are derived from the ethoxylated polyalkylene polyamines as defined by formula II. In this formula m represents 1 or 2, that is, the basic materials are diethylenetriamine, triethylenetetramine, or mixtures thereof. Higher or lower polyalkylene polyamines display a reduction in their effectiveness. Preferred are compounds having 5 to 10 ethoxyl groups in the amine cation since when combined with the maleic amide acid, these best display the solubility properties corresponding with the goals of this invention.

The salts according to this invention may be used in all systems based on crude oil and (salt) water emulsions. They display good effectiveness, for instance, in crude oil demulsification processes and during the transport of such crude oil emulsions. The corrosive attack of the salt water separated during the emulsifying processes, which is also removed by pipelines containing iron, is inhibited by the addition of the salts according to the invention. The salts are added to the water-in-oil emulsions in quantities of 50 to 500 ppm.

The following examples illustrate various aspects of the invention but are not intended to limit its scope. Where not otherwise specified throughout this specification and claims, temperatures are given in degrees centigrade and parts, percentages, and proportions are by weight.

The following compounds were used as corrosion inhibitors.

(1) Maleic iso-tridecylamide acid as salt of the fivefold ethoxylated diethylenetriamine.
(2) Maleic iso-tridecylamide acid as salt of the tenfold ethoxylated diethylenetriamine
(3) (Control) Maleic iso-tridecylamide acid-triethanolamine salt (according to German published Application No. 27 58 123).

EXAMPLE 1

A 5 percent aqueous solution of (1) was added in in different quantities to a mixture of test gasoline and a 3 percent NaCl solution under a $CO_2$ atmosphere. Steel sheet (carbon steel) was placed in these mixtures and was left in the mixture for twenty-one days. Following this period, the corrosive material reduction was determined. The material reduction is listed in percent of the blank value.

EXAMPLE 2

The same mixture was tested but under a $H_2S$ atmosphere.

EXAMPLE 3

In this case a salt water-in-oil emulsion (Reitbrook Crude Oil) was used and the remaining procedure was that described in Example 1.

The results are listed in the following table:

TABLE

| | Percent of Material Removed by Corrosion | | | | |
| --- | --- | --- | --- | --- | --- |
| | Example | | | | |
| | 1 | | | 2 | 2 |
| Amount Applied Blank Sample | 250 ppm | 350 ppm | 400 ppm | 350 ppm | 350 ppm |
| Corrosion Inhibitor | | 85 mg | | 100 mg | 27 mg |
| 1 | 64% | 60% | 53% | 43% | 39% |
| 2 | 60% | 56% | 53% | 40% | 37% |
| 3 (control) | 70% | 68% | 66% | 62% | 46% |

While this invention has been described with reference to certain specific embodiments, it will be recognized by those skilled in this art that many variations are possible without departing from the scope and spirit of the invention.

The embodiments of the invention in which an exclusive property or privilege is claimed are defind as follows:

1. A corrosion inhibitor compound for use in preventing the corrosion of iron and metals containing iron in contact with water-in-oil emulsions, said corrosion inhibitor having the formula

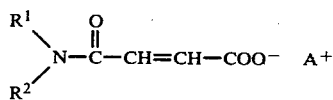  I wherein $R^{11}$ is an alkyl radical having 7 to 20 carbon atoms, $R^2$ represents hydrogen or $R^1$ and $A^+$ represents the protonized radical of an amine having the formula

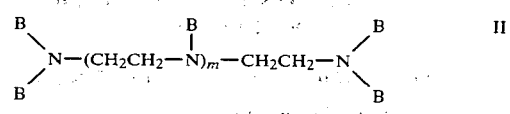  II wherein B represents hydrogen or $(C_2H_4O)_x$, wherein x is an integer of 1–3 with the proviso that the total number of $C_2H_4O$ radicals in the molecule is 3–18 and m is 1 or 2.

2. The compound of claim 1 wherein formula I is derived from a maleic amide acid having the formula

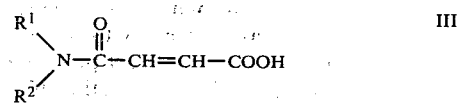  III wherein $R^1$ is an alkyl radical having 7 to 20 carbon atoms and $R^2$ is hydrogen or $R^1$.

3. The composition of claim 2 wherein $R^1$ is an alkyl radical having 10 to 18 carbon atoms.

4. The compound of claim 3 wherein said maleic amide acid is selected from the group consisting of maleic octyl-amide acid, maleic decylamide acid, maleic dodecylamide acid, maleic tridecylamide acid, and maleic octadecylamide acid.

5. The compound of claim 4 wherein the amines upon which the amide components are based are derived from at least one of the mixtures of oxoalcohols selected from the group consisting of a mixture of $C_9$ to $C_{11}$ oxoalcohols, a mixture of $C_{13}$ to $C_{15}$ oxoalcohols, and a mixture of $C_{17}$ to $C_{19}$ oxoalcohols.

6. The compound of claim 1 wherein the ethoxylated polyalkylene polyamine of formula II is derived from an amine selected from the group consisting of at least one of diethylenetriamine and triethylenetetramine each ethoxylated with 5 to 10 ethoxyl groups.

7. A mixture of water and oil as a water-in-oil emulsion and a corrosion inhibiting amount of a salt compound having the formula:

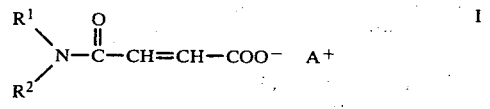  I wherein $R^1$ is an alkyl radical having 7 to 20 carbon atoms, $R^2$ represents hydrogen or $R^1$ and $A^+$ represents the protonized radical of an amine having the formula:

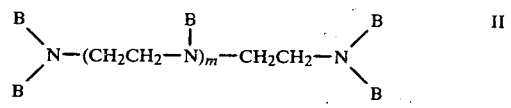  II wherein B represents hydrogen or $(C_2H_4O)_x$, wherein x is an integer of 1–3 with the proviso that the total number of $C_2H_4O$ radicals in the molecule is 3–18 and m is 1 or 2.

8. The composition of claim 7 wherein said water is salt water and said oil is crude oil.

9. The composition of claim 8 wherein said salt compound is derived from a maleic amide acid having the formula:

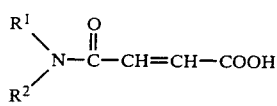   III wherein $R^1$ is an alkyl radical having 7 to 20 carbon atoms and $R^2$ is hydrogen or $R^1$.

10. The composition of claim 9 wherein $R^1$ is an alkyl radical having 10 to 18 carbon atoms.

11. The composition of claim 10 wherein said maleic amide acids are selected from the group consisting of at least one of maleic octylamide acid, maleic decylamide acid, maleic dodecylamide acid, maleic tridecylamide acid, and maleic octadecylamide acid.

12. The composition of claim 11 wherein the amines upon which the amide components are in turn derived from at least one of the oxoalcohol mixtures selected from the group consisting of a mixture of $C_9$ to $C_{11}$ oxoalcohols, a mixture of $C_{13}$ to $C_{15}$ oxoalcohols, and a mixture of $C_{17}$ to $C_{19}$ oxoalcohols.

13. The composition of claim 12 wherein said formula II is derived from an amine selected from the group consisting of at least one of diethylenetriamine and triethylenetetramine each ethoxylated with 5 to 10 ethoxyl groups.

14. In a process for inhibiting the corrosion of iron or metals containing iron in contact with water-in-oil emulsions, the improvement wherein said water-in-oil emulsion comprises a corrosion inhibiting salt of the formula

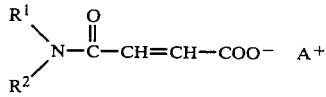   I wherein $R^1$ is an alkyl radical having 7 to 20 carbon atoms, $R^2$ represents hydrogen or $R^1$ and $A^+$ represents the protonized radical of an amine having the formula

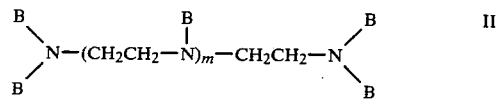   II wherein B represents hydrogen or $(C_2H_4O)_x$, wherein x is an integer of 1–3 with the proviso that the total number of $C_2H_4O$ radicals in the molecule is 3–18 and m is 1 or 2.

15. The process of claim 14 wherein the maleic amide acid upon which said salt is based has the formula

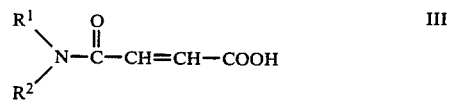   III wherein $R^1$ is an alkyl radical having 7 to 20 carbon atoms and $R^2$ is hydrogen or $R^1$.

16. The process of claim 15 wherein said maleic amide acids are defined as having $R^1$ equal to an alkyl group having 10 to 18 carbon atoms.

17. The process of claim 16 wherein said maleic amide acids are selected from the group consisting of at least one of maleic octylamide acid, maleic decylamide acid, maleic dodecylamide acid, maleic tridecylamide acid, and maleic octadecylamide acid.

18. The process of claim 17 wherein the amines upon which the amide components are in turn derived from at least one of the oxoalcohol mixtures selected from the group consisting of a mixture of $C_9$ to $C_{11}$ oxoalcohols, a mixture of $C_{13}$ to $C_{15}$ oxoalcohols, and a mixture of $C_{17}$ to $C_{19}$ oxoalcohols.

19. The process of claim 18 wherein the ethoxylated polyalkylene polyamines as defined by formula II are derived from an amine selected from the group consisting of at least one of diethylenetriamine and triethylenetetramine each ethoxylated with 5 to 10 ethoxyl groups.

20. The process of claim 19 herein said corrosion inhibiting salt is used in said water-in-oil emulsion in the amount of 50 to 500 parts per million of said emulsion.

* * * * *

UNITED STATES PATENT AND TRADEMARK OFFICE
CERTIFICATE OF CORRECTION

PATENT NO. : 4,405,494

DATED : September 20, 1983

INVENTOR(S) : KNUT OPPENLAENDER et al

It is certified that error appears in the above—identified patent and that said Letters Patent is hereby corrected as shown below:

Column 4, Claim 1, line 1, change $R^{11}$ to "$\underline{R^1}$".

Signed and Sealed this

Twenty-seventh Day of December 1983

[SEAL]

Attest:

GERALD J. MOSSINGHOFF

Attesting Officer     Commissioner of Patents and Trademarks